(12) United States Patent
Hernandez

(10) Patent No.: US 7,186,175 B2
(45) Date of Patent: Mar. 6, 2007

(54) HANGING ELEMENT

(76) Inventor: Jose Mazo Hernandez, Crta. de Martorell, 253, 98224 Barcelona (ES)

( * ) Notice: Subject to any disclaimer, the term of this patent is extended or adjusted under 35 U.S.C. 154(b) by 0 days.

(21) Appl. No.: 10/561,953

(22) PCT Filed: Jun. 14, 2004

(86) PCT No.: PCT/ES2004/000270

§ 371 (c)(1),
(2), (4) Date: Dec. 22, 2005

(87) PCT Pub. No.: WO2005/002347

PCT Pub. Date: Jan. 13, 2005

(65) Prior Publication Data

US 2006/0199487 A1    Sep. 7, 2006

(30) Foreign Application Priority Data

Jul. 1, 2003    (ES) ................. 200301524

(51) Int. Cl.
*A22C 17/00* (2006.01)
(52) U.S. Cl. .................................. 452/187
(58) Field of Classification Search ............ 452/185, 452/187–193, 198
See application file for complete search history.

(56) References Cited

U.S. PATENT DOCUMENTS

| | | | |
|---|---|---|---|
| 970,845 A * | 9/1910 | Lewis, Jr. ............. 84/323 |
| 1,742,569 A * | 1/1930 | Barker et al. ........... 452/188 |
| 2,035,948 A * | 3/1936 | De Vout ............... 452/188 |
| 4,227,668 A | 10/1980 | Ernst | |
| 4,343,266 A * | 8/1982 | Moeller ............... 119/728 |
| 4,370,778 A | 2/1983 | Madsen | |
| 4,372,009 A * | 2/1983 | Linville ............... 452/183 |
| 4,720,010 A | 1/1988 | Bertram | |
| 5,269,116 A | 12/1993 | Roberts et al. | |
| 5,772,499 A | 6/1998 | Niedecker | |
| 5,781,112 A * | 7/1998 | Shymko et al. ........ 340/10.3 |
| 6,017,269 A * | 1/2000 | Altenpohl, III ........ 452/188 |

FOREIGN PATENT DOCUMENTS

| DE | 3125631 A1 | 1/1983 |
|---|---|---|
| DE | 20201564 U1 | 6/2003 |
| WO | WO 85/00956 | 3/1985 |

* cited by examiner

Primary Examiner—Thomas Price
(74) Attorney, Agent, or Firm—Blank Rome LLP

(57) ABSTRACT

A hanging element that may include an extended body with a lower insertion body and an upper closure head forming a matrix of hanging elements joined to each other via the side projections. Each insertion body extends into a wire which ends as a Y joint where the respective single wires split to form a closed loop which joined together in the closure head and into which the hook or similar product may be hung to hang of a piece of meat or other object which remains suspended from the insertion body. The closure head may have on its upper end a ringbolt or attachment and includes an identification tag through the joint. The hanging element allows automated insertion using an appropriate tool and at the same time guarantees maximum hygiene because it is disposable.

8 Claims, 2 Drawing Sheets

FIG. 1
FIG. 2
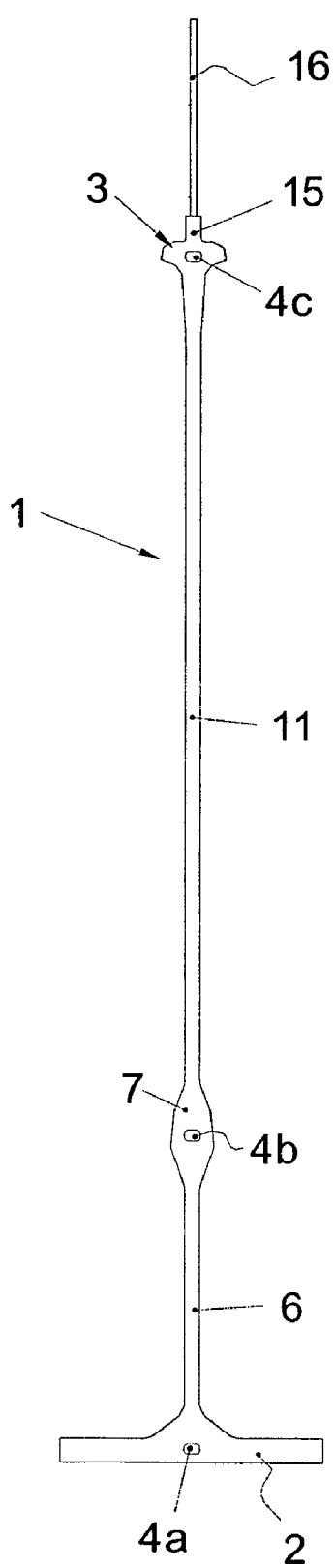
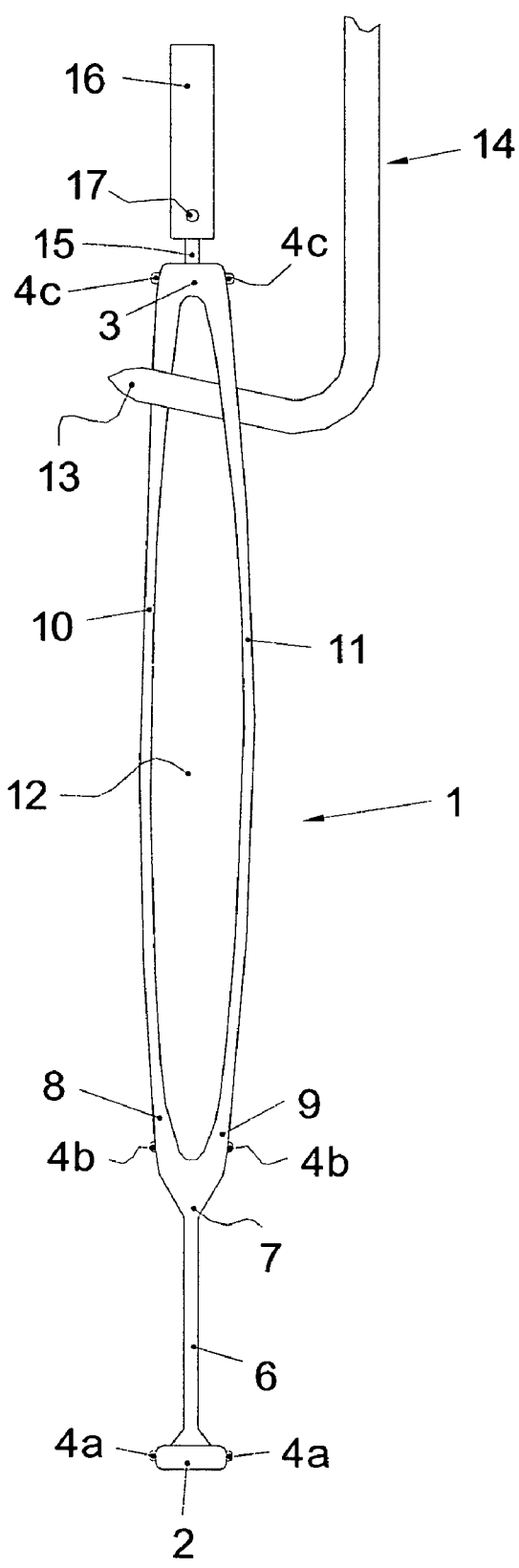

HANGING ELEMENT

FIELD OF THE INVENTION

The invention particularly refers to, (although not exclusively), a hanger for food products, such as pieces of meat, sausages, cured ham, etc. It is manufactured from a strong plastic material and has been especially designed to hang these foodstuffs so that they remain suspended. Although, as has been already stated, the main purpose for this invention is for pieces of meat and other foodstuffs, it must be particularly highlighted that hanging applications (as will be described below) may also be extended to other technical areas where heavier or lighter objects are to be automatically and efficiently hung, with minimal intervention from the user.

BACKGROUND OF THE INVENTION

There are many ways of hanging objects so that they remain suspended. In the particular case of meat products (for example hams, sausages, etc), these are currently hung up and identified after the animal has been slaughtered with ropes, raffia and metal hooks which are attached to a bar in order to display the products to the public, or to transport them along processing lines in slaughterhouses, etc. The main drawback to this form of holding a food product is the high probability of mites, bacteria, accumulated dirt and possible contamination entering the product. This may pose a serious problem to the health of the consumer. Moreover, manual hanging using this type of holder and identification causes additional work for personnel handling the products, especially when this is being carried out in industrial installations which handle a high number of pieces per day.

The international patent application number WO 83/02048 describes a loop for transporting pieces of meat suspended on hooks made from a strip of plastic material which is inserted into the meat products, the end of which is suspended on the hook. On the lower part of the loop there is a perpendicular support firmly connected to the upper part of the loop in order to suspend the product.

Although the solution offered by the patent seeks to solve the problem of hygiene when displaying pieces of meat to the public, it nevertheless does not solve the problem of excessive time required to place the loop on a large number of pieces, given that this process is completely manual, because the loop is inserted into the piece of meat with a punch. Therefore, the user's muscles become tired, due to the fact that this force is done manually and there is a risk of tendonitis, etc.

SUMMARY OF THE INVENTION

The invention proposes a new hanging element for meat products which is generally applicable to any area requiring a heavy or light object to be hung so that it is suitably suspended for display, transport, etc. This invention, as shall be described in greater detail below, resolves the aforementioned problem as well as achieving maximum hygiene and safety.

The hanging element in this invention is essentially formed by an extended body equipped with a first end or piece for inserting into the body of the object to be hung. Inserting the hanging element is done using an application gun which may be pneumatic, electric or in any other appropriate form. The aforementioned insertion body is initially in a T shape, the perpendicular end of which is folded over to be applied by the aforementioned gun until it is aligned with the hanging element and therefore may be inserted (for example into the body of a piece of meat). Once it has gone through the meat, the T shape at the first end returns to its original position and the object to be hung up is perfectly suspended as already described. The second opposite end or closure head will be described in greater detail below.

The particular nature of this hanging element is that it includes at least one side connection projection for joining several hanging elements side-by-side in order to have several hanging elements in a matrix or comb shape.

In this way, the presentation of the hanging elements may be in a matrix or in a line of several pieces joined to each other by the insertion body. The main advantage of this form of presentation is that the hanging element may be inserted through the hanging element's loader on its application gun. This is a great advantage because the insertion of hanging elements into objects to be hung up can be rapidly and efficiently automated, hygienically and safely solving the problems of the aforementioned technique (it is a product with no toxicity), significantly reducing costs.

It must also be particularly highlighted that, because the hanging element is applied using the aforementioned gun (which alternatively may also be a machine tool), no residue whatsoever is produced by joining the parts. In other words, while the hanging parts are being applied to the aforementioned matrix or comb, the gun does not release any waste from this matrix, given that the joint between the parts is made by this projection which belongs to the body in the hanging element itself.

The hanging element, described in accordance with the invention, is preferably manufactured in a highly resistant plastic material having a certain degree of flexibility. The materials used are selected from suitable plastics recommended by health authorities in order to avoid any form of unwanted reaction with the foodstuffs to which it is being applied. This protects the environment by not leaving waste products and by being recyclable, as has already been stated. Also, the hanging element is obtained during the injection process and is capable of supporting weights of 100 kg or more. The manufacture of the hanging element using plastic injection gives the invention and undoubted competitive price advantage. Also, as this hanging element is likely to be discarded after use, there is a health advantage and there is a consequent saving in cleaning tasks which are currently performed on reusable steel hooks.

As has already been stated, the hanging element is made into matrices or combs suitable for use with a pneumatic, electric or other type of gun for pieces of meat (or any other piece to be hung up). This will automate the process of applying hanging elements as well as assist in identifying the same.

From a structural point of view, the hanging elements in the invention have the aforementioned first and second end (insertion body and closure head respectively). The first end is extended in a single wire which ends with a Y shaped joint, the ends of which are in single wires. These single wires are in a closed loop which meets at a closure head. A hook or similar article may be hung within the loop in order to hang a piece of meat or any other product (for example, fish, etc.). The piece to be hung is suspended from the insertion body on the hanging element. It may also be used in meat transport lines and other products during production processes. These products may be hung in the same way using bars with hooks, displays with fixed hooks and trolleys with fixed hooks, etc.

The hanging element is made from at least one side projection in this insertion body, a Y shaped joint and the aforementioned head respectively. This configuration allows joining several adjacent pieces to be improved in order to hang many pieces configured as a matrix or comb. It must be noted that the preferred configuration for the invention is where the aforementioned projections are on both sides of the insertion body in the Y shaped joint and the head, respectively.

The closure head may have a ring bolt or attachment on its upper end which may include an identification tag with a hole through the joint. This identification tag may be a label, microchip, barcode or similar. This option allows the features of the product to be hung, price details and other information of interest such as its origins to be shown. This identification tag may be printed with ink.

It must be stated that the hanging element in this invention has absolutely unlimited applications stated above for food products, such as pieces of meat, sausages, cured hams etc and it may be used in a wide variety of additional applications. Therefore, for example, the hanging element may be inserted via the insertion body into the roof of curers and other similar small areas using the hole made in it. Once the piece is hung from the ceiling, the object is to be hung up may be held by the ring. By turning it, the piece is tied holding it without the possibility of it being released, i.e acting as a form of clamp.

Moreover, the hanging element in this invention may be manufactured in different colours to facilitate rapid identification of the hanging object in such a way that all foodstuffs of the same type or class being held by the invention's hanging elements have the same colour.

BRIEF DESCRIPTION OF THE DRAWINGS

The features and advantages of the hanging element in this invention shall become clear from the detailed description of the preferred use stated hereinafter as a non limiting example using the attached drawings:

FIG. 1 is a side elevation of the hanging element in the invention;

FIG. 2 is a front elevation of the hanging element from FIG. 1;

Figure 3:
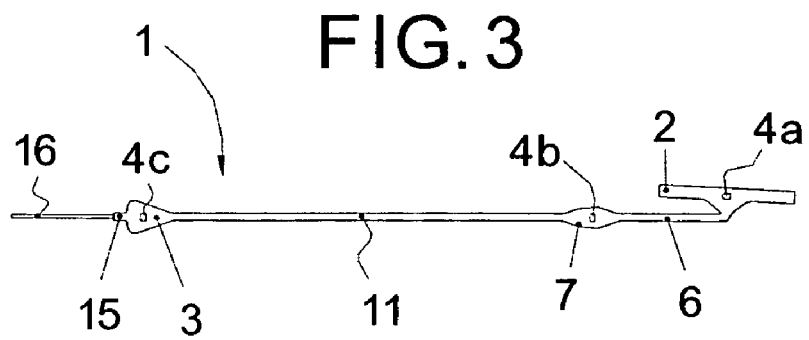
FIG. 3 is the side elevation of the hanging element from FIG. 1, but with the insertion body substantially turned, aligning it with the rest of the hanging element for its insertion into a piece of meat or similar product.

Listed below are the different pieces which have been used to describe the preferred layout of this invention:

(1) hanging element;
(2) insertion body
(3) closure head;
(4a, 4b, 4c) side projections for joining hanging elements;
(5) matrix or comb of hanging elements;
(6) single wire;
(7) Y joint;
(8, 9) Y joint ends;
(10, 11) loop single wires;
(12) interior of loop;
(13) end of hook;
(14) hook;
(15) joint area;
(16) identifying tag; and
(17) hole.

DETAILED DESCRIPTION OF THE PREFERRED EMBODIMENTS

The preferred use of the hanging element for the invention is described below using the drawings attached to this report.

The hanging element is illustrated as an example and is mainly used to hang food products such as pieces of meat, cured hams, although it is likely to also be used in any other application which requires hanging a lighter or heavier object so that it remains suspended.

The hanging element illustrated in figures one and four basically include an extended body both referred to (1) in the drawings. This extended body (1) has a first end or insertion body (2) on its lower section. This may be adapted to be inserted into the piece to be hung up, for example a piece of ham, a piece of meat, sausages, cured hams, etc as indicated above.

Inserting the hanging element (1) is by using an application gun (not shown), which does not form part of this invention.

The insertion body (2) is initially T-shaped as can be seen in the side elevation in FIG. 1. During the insertion of the hanging element (1) into the piece to be hung up, the single wire (6) of the hanging element is folded over at its perpendicular end (2) it is in line as shown in FIG. 3 until. The aforementioned single wire (6) is folded by the aforementioned application gun. Once inserted into the body (2) it returns to its normal position, i.e. again forming an approximately 90° angle with the single wire (6) on the hanging element so that the body to be hung up may be suspended perfectly without the possibility of it being released.

The hanging element has a second end at the opposite extreme or closure head (3) on the upper part as can be seen in the figures.

The hanging element (1) which is illustrated has a series of side projections (4a, 4b, 4c) on both sides of the insertion body (2), the Y shaped joint (7) and the aforementioned head (3), respectively. This allows several hanging pieces to be joined to each other in order to have many hanging pieces in a matrix (5) or comb format as shown in FIG. 4.

This matrix or comb (5) format includes a line of several hanging elements (1) joined to each other by the aforementioned side projections (4a, 4b, 4c) on the corresponding hanging elements (1) to be loaded into an application gun (not shown in the figures) without creating any waste matter from the aforementioned matrix (5). This is because the projections (4a, 4b, 4c) continue to be part of the individual hanging element once this has become separated from the matrix (5) or comb.

The hanging element (1) is manufactured from a strong plastic material with a certain elasticity to allow the inserted end (2) to reform its initial shape once it has been inserted into the body to be hung up, as previously described.

Figure 4:
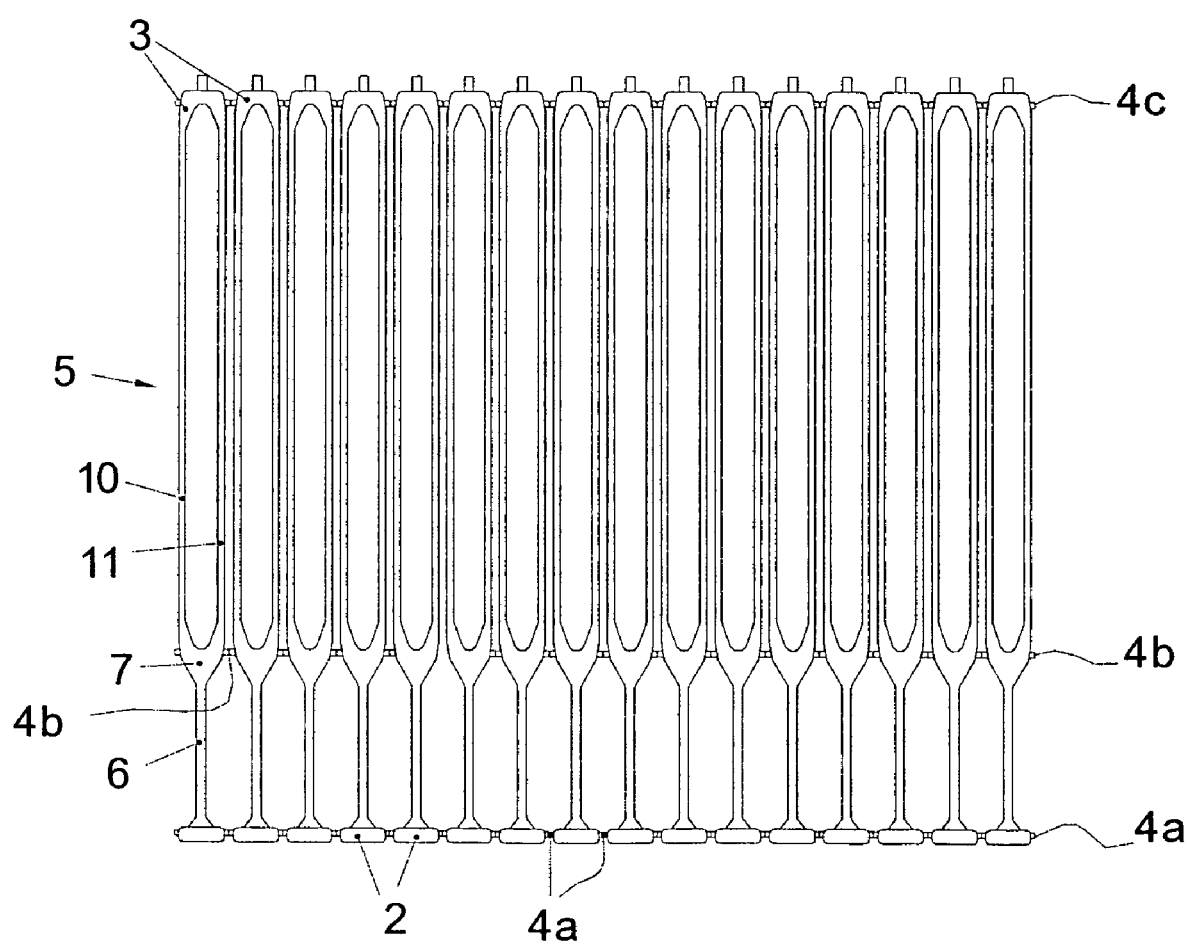
FIG. 4 is a front elevation with the invention joining many hanging pieces through their sides forming a matrix or comb of many units for their transport, packing, storage, presentation and application using a gun, machine tool or other suitable tool.

The lower end (2) of the hanging element (insertion body) as described in the figures is extended by the aforementioned single wire (6) which ends at its opposite end in a Y shaped joint (7) (see front elevations in FIGS. 2 and 4). The ends of this Y shaped joint (8, 9) splitting the respective single wires (10, 11) form a closed loop which meets at the closure head. The hanging element in this invention may be hung from a hook (14) in such a way that its end (13) is inserted into the loop holding the piece of meat (or any other suitable application for other products such as fish) suspended from the insertion body (2).

It must be particularly stated that the hanging element being described may also be used on meat or other product transportation lines and other production processes. These products may be hung from bars with hooks, displays with fixed hooks and trolleys with fixed hooks, etc. This prevents the food product from becoming dirty and contaminated.

The loop defined by the single wires (10, 11) which split from the Y piece (7) is closed through the closure head (3). This head (3) may have on its upper end a ringbolt or attachment and may include, through a joint (15) and identification tag (16) equipped with a hole (17). The identification tag (16) may be, for example, a label, a barcode, microchip etc to identify the product, its price and any other information of interest. It may also have a seal for a hanging label (not shown) through the aforementioned hole (17) in the identification tag (16), as may be seen in FIG. 2. As an alternative, the identification tag (16) may also be overprinted.

Having described the hanging element in this invention using the relevant drawings attached, it is understood that changes to the detail of the same may be introduced when these are deemed to be suitable, where the essential features of the invention summarised in the following claims are not altered.

The invention claimed is:

1. A hanging element, comprising of:
an extended body equipped with a substantially T-shaped insertion end and an opposite closure head, characterized by the fact that the extended body includes at least one outwardly extending side projection adapted to engage another hanging element in order to form a matrix of hanging elements.

2. A hanging element, according to claim 1, wherein between the insertion end and the closure head is a closed loop which ends in a Y joint for receiving a suspension member.

3. A hanging element, according to claim 2, characterized by the fact that the closure head has an identification tag at one end through the joint.

4. A hanging element according to claim 3, wherein the identification tag is one of a label, microchip, and barcode.

5. A hanging element, comprising of:
an extended body having a first insertion end that is flexible and a second opposite closure head end, wherein
the extended body includes at least one side projection extending outwardly therefrom adapted to engage another side projection of a second adjacent hanging element, thereby connecting at least two hanging elements, and the two hanging elements being disposed in the same plane.

6. A hanging element, according to claim 1, wherein the first insertion end is extended by a single wire, which bifurcates a Y joint end to form a closed loop which meets at the closure head end, so that an end of a suspension member is receivable inside the closed loop.

7. A hanging element assembly, comprising of:
a first hanging element having an extended body including a first insertion end and a second closure head end opposite the first end, the extended body including a first side projection extending outwardly therefrom;
a second hanging element having an extended body including a first insertion end and a second closure head end opposite the first end, the extended body including a second side projection extending outwardly therefrom; and
whereby the first side projection engages the second side projection, thereby coupling the first and second hanging elements.

8. A hanging element assembly according to claim 7, wherein
a third hanging element having an extended body including a first insertion end and a second closure head end opposite the first end, the extended body including a third side projection extending outwardly therefrom;
whereby the third side projection of the third hanging element engages a side projection of the second hanging element, thereby forming a matrix of the first, second, and third hanging elements.

* * * * *